(12) United States Patent
Yamamoto et al.

(10) Patent No.: US 7,282,231 B2
(45) Date of Patent: Oct. 16, 2007

(54) DOUGHNUT LIKE DUMPLING COVERED WITH SESAME SEEDS, DOUGH USED FOR PREPARING THE DOUGHNUT AND METHOD FOR THE PREPARATION OF THE DOUGHNUT

(75) Inventors: Katsuyuki Yamamoto, Itami (JP); Kimihito Wada, Nishinomiya (JP)

(73) Assignee: Marsutani Chemical Industries Co., Ltd., Hyogo (JP)

( * ) Notice: Subject to any disclaimer, the term of this patent is extended or adjusted under 35 U.S.C. 154(b) by 668 days.

(21) Appl. No.: 10/652,249

(22) Filed: Sep. 2, 2003

(65) Prior Publication Data
US 2004/0166218 A1    Aug. 26, 2004

(30) Foreign Application Priority Data
Feb. 24, 2003    (JP) ............................ 2003-46070

(51) Int. Cl.
*A02D 13/00* (2006.01)
(52) U.S. Cl. .................. 426/94; 426/496; 426/549; 426/661; 426/808
(58) Field of Classification Search ............. None
See application file for complete search history.

(56) References Cited
U.S. PATENT DOCUMENTS 5,595,773 A * 1/1997 Wada et al. ............ 426/20
6,039,997 A * 3/2000 Mizoguchi et al. ......... 426/549
6,881,429 B2 * 4/2005 Geng et al. .................. 426/94

FOREIGN PATENT DOCUMENTS

| JP | 10304815 A | 11/1998 |
|---|---|---|
| JP | 10313787 A | 12/1998 |

* cited by examiner

*Primary Examiner*—Lien Tran
(74) *Attorney, Agent, or Firm*—Sughrue Mion, PLLC

(57) ABSTRACT

A doughnut like a dumpling covered with sesame seeds is prepared using a powdery raw material, which comprises 50 to 80 parts by weight of ungelatinized starch, 6 to 25 parts by weight of pregelatinized starch, 7 to 30 parts by weight of wheat flour and 7 to 25 parts by weight of a saccharide. Dough used for the preparation of a doughnut like a dumpling covered with sesame seeds is obtained by adding water and, if needed, a seasoning component to the foregoing powdery raw material to thus form dough, dividing the resulting dough into small pieces and forming each small piece into a desired shape and, if needed, stuffing the shaped dough with fillings. The foregoing doughnut can be prepared by frying the foregoing dough. The doughnut like a dumpling covered with sesame seeds is excellent in the storage stability and has excellent sticky and resilient feeling upon eating like a rice cake.

12 Claims, No Drawings

DOUGHNUT LIKE DUMPLING COVERED WITH SESAME SEEDS, DOUGH USED FOR PREPARING THE DOUGHNUT AND METHOD FOR THE PREPARATION OF THE DOUGHNUT

BACKGROUND OF THE INVENTION

The present invention relates to a doughnut like a dumpling covered with sesame seeds excellent in storage stability or keeping quality, dough used for the preparation of the doughnut and a method for the preparation of the doughnut.

The dumpling covered with sesame seeds well known as a dessert in the Chinese restaurant is prepared from refined rice flour as a raw material and mouth feeling like a rice cake (the sticky and resilient feeling) thereof observed when it is practically eaten would be the reason why it has widely been favored. However, the dumpling covered with sesame seeds is a food, which should be eaten immediately after it is prepared or after the deep-frying operation and it suffers from a problem such that if it is stored over one to two days, it looses the sticky and resilient feelings, upon eating, peculiar thereto.

On the other hand, the doughnut as a typical deep-fried food includes one called the yeast doughnut prepared by adding yeast to dough to thus ferment the dough, forming it into a desired shape and then frying the shaped dough and one called the cake doughnut obtained by forming baking powder-containing dough into a desired shape and then frying the shaped dough as well as one free of any yeast and/or baking powder such as CHURROS. In other words, there have been known various kinds of doughnuts, while taking into consideration the shapes thereof. However, all of these foods are prepared using wheat flour as a principal raw material and can provide crispy feeling upon eating, which is quite different from the sticky and resilient feeling of, for instance, a dumpling covered with sesame seeds.

Japanese Un-Examined Patent Publication Hei 10-313787 discloses a rice-cake-like fried food having an oil-absorption rate, as determined after frying, ranging from 1 to 10% and prepared from tapioca starch and a processed product thereof as principal ingredients, although it would not be clear whether the rice-cake-like fried food is a doughnut or not. In this case, the fried food is not only literally a rice-cake-like food rather than a doughnut because it is called an ISOBEYAKI-like food or a food like a rice-cake stuffed with sweetened bean jam, but also its sticky and resilient feelings upon eating last even on the day subsequent to the preparation thereof. However, it can maintain its taste and texture only for such a short period of time and therefore, the food is not suitable for the production on a large scale.

Moreover, Japanese Un-Examined Patent Publication Hei 10-304815 discloses a method for preparing a ball-like cake doughnut, which comprises the steps of forming, into a ring-like shape, dough containing 100 parts by weight of wheat flour and 3 to 20 parts by weight of cross-linked starch and then deep-frying the shaped dough pieces in heated oil and this patent states that ball-like cake doughnuts can thus stably be prepared in a high yield, but this patent literature does not particularly intend to improve the taste and texture of the food.

As has been described above, there has not yet been known any investigation of a food having a doughnut-like appearance, sticky and resilient feelings upon eating like a dumpling covered with sesame seeds and it is excellent in stability in the mouth feeling, taste and texture with the elapse of time.

SUMMARY OF THE INVENTION

Accordingly, an object of the present invention is to provide a food having a doughnut-like appearance, sticky and resilient feelings upon eating like a dumpling covered with sesame seeds and it is excellent in stability in the mouth feeling, taste and texture with the elapse of time.

Another object of the present invention is to provide dough used for the preparation of the foregoing doughnut-like food.

A still another object of the present invention is to provide a method for preparing the aforementioned doughnut-like food (hereunder also referred to as "doughnut").

The inventors of this invention have conducted various studies to solve the foregoing problems associated with the conventional techniques, have found that the use of raw flour comprising ungelatinized starch, pregelatinized starch, wheat flour and a saccharide in a specific mixing ratio permits the preparation of a food having a doughnut-like appearance, sticky and resilient feelings upon eating like a dumpling covered with sesame seeds and it is excellent in stability in the mouth feeling, taste and texture with the elapse of time and have thus completed the present invention.

According to the present invention, there are provided the following doughnut, dough used for the preparation thereof and a method for the preparation of the same:

1. A doughnut like a dumpling covered with sesame seeds prepared using a powdery raw material, which comprises 50 to 80 parts by weight of ungelatinized starch, 6 to 25 parts by weight of pregelatinized starch, 7 to 30 parts by weight of wheat flour and 7 to 25 parts by weight of a saccharide.
2. The doughnut like a dumpling covered with sesame seeds as set forth in the foregoing item 1, wherein the amount of the saccharide ranges from 15 to 25 parts by weight.
3. The doughnut like a dumpling covered with sesame seeds as set forth in the foregoing item 2, wherein the doughnut is stuffed with fillings.
4. The doughnut like a dumpling covered with sesame seeds as set forth in any one of the foregoing items 1 to 3, wherein the ungelatinized starch is starch acetate and/or hydroxypropyl starch obtained from at least one member selected from the group consisting of glutinous rice starch, waxy corn starch and tapioca starch.
5. The doughnut like a dumpling covered with sesame seeds as set forth in any one of the foregoing items 1 to 4, wherein not less than 50% by weight of the saccharide is a starch hydrolysate having a DE value ranging from 8 to 26.
6. Dough used for the preparation of a doughnut like a dumpling covered with sesame seeds obtained by adding water and, if needed, a seasoning component to a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide to thus form dough, dividing the resulting dough into small pieces and shaping each small piece into a desired shape and, if needed, stuffing the shaped dough with fillings.
7. The dough used for the preparation of a doughnut like a dumpling covered with sesame seeds as set forth in the foregoing item 6, wherein the amount of the saccharide ranges from 15 to 25 parts by weight.
8. The dough used for the preparation of a doughnut like a dumpling covered with sesame seeds as set forth in the foregoing item 7, wherein the dough is stuffed with fillings.
9. The dough used for the preparation of a doughnut like a dumpling covered with sesame seeds as set forth in any one of the foregoing items 6 to 8, wherein the ungelatinized starch is starch acetate and/or hydroxypropyl starch obtained from at least one member selected from the group consisting of glutinous rice starch, waxy corn starch and tapioca starch.
10. The dough used for the preparation of a doughnut like a dumpling covered with sesame seeds as set forth in any one of the foregoing items 6 to 9, wherein not less than 50% by weight of the saccharide is a starch hydrolysate having a DE value ranging from 8 to 26.
11. The dough used for the preparation of a doughnut like a dumpling covered with sesame seeds as set forth in any one of the foregoing items 6 to 10, wherein yeast is added to the dough during the preparation thereof to thus ferment the dough.
12. The dough used for the preparation of a doughnut like a dumpling covered with sesame seeds as set forth in any one of the foregoing items 6 to 11, wherein the dough is frozen.
13. A method for the preparation of a doughnut like a dumpling covered with sesame seeds as set forth in any one of the foregoing items 1 to 5 comprising the step of frying dough used for the preparation of a doughnut like a dumpling covered with sesame seeds as set forth in any one of the foregoing items 6 to 12.
14. A method for the preparation of a doughnut like a dumpling covered with sesame seeds as set forth in any one of the foregoing items 1 to 5 comprising the step of frying frozen dough as set forth in the foregoing item 12 without thawing the frozen dough.

DESCRIPTION OF THE PREFERRED EMBODIMENTS

According to the present invention, there are provided a doughnut like a dumpling covered with sesame seeds obtained using a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide, dough used for the preparation of the foregoing doughnut and a method for the preparation of such a doughnut.

The term "like a dumpling covered with sesame seeds" herein used means that the intended food of the present invention has sticky and resilient feelings upon eating similar to those observed for the dumpling covered with sesame seeds. Accordingly, the term "doughnut like a dumpling covered with sesame seeds" herein used means a doughnut having sticky and resilient feelings upon eating similar to those observed for the dumpling covered with sesame seeds. In addition, the term "doughnut" herein used includes a yeast doughnut prepared by adding yeast to dough to thus ferment the dough, forming it into a desired shape and then frying the shaped dough, a cake doughnut obtained by forming baking powder-containing dough into a desired shape and then frying the shaped dough and a doughnut free of any yeast and/or baking powder such as CHURROS. Moreover, the shape thereof is not restricted to any specific one, it may accordingly be any desired one and specific examples thereof include ring-like, ball-like, rod-like, straw bag-like and twisted shapes.

The "powdery raw material" used in the present invention comprises ungelatinized starch, pregelatinized starch, wheat flour and a saccharide. These ingredients for the powdery raw material may be admixed in advance to form a premix or they may separately be incorporated into dough when preparing the same. In this connection, other powdery raw materials such as rice flour, buckwheat flour, corn flour and/or rye flour may, if desired, be used as a part of the foregoing powdery raw material inasmuch as the ungelatinized starch, pregelatinized starch, wheat flour and a saccharide satisfy the requirement for the mixing ratio as will be detailed below.

The term "ungelatinized starch" used in the present invention means starches showing polarization crosses when they are observed under a polarizing microscope and specific examples thereof include commercially available various kinds of starches such as potato starch, sweet potato starch, tapioca starch, waxy corn starch, wheat starch and rice starch; modified starches derived from these commercially available ones such as bleached starches, esterified starches and etherified starches. Among these, preferred are tapioca starch, waxy corn starch and glutinous rice starch and starch acetates and/or hydroxypropyl starches derived therefrom, with starch acetates and/or hydroxypropyl starches being more preferably used herein since they can enhance the sticky and resilient feelings, upon eating, of the resulting product and they can permit the achievement of the sustained sticky and resilient feelings upon eating.

The starch acetate can be prepared by reacting each starch with acetic anhydride or vinyl acetate monomer and the hydroxypropyl starch can be obtained by reacting each starch with propylene oxide. The extent of each reaction as expressed in terms of the degree of substitution (the number of substituents per glucose unit present in each starch) preferably ranges from 0.05 to 0.18. This is because if the degree of substitution is less than 0.05, the resulting modified starch is almost identical to the starch free of such a treatment, while if it exceeds 0.18, the resulting starch ensures the sticky or glutinous feelings of the doughnut finally obtained, but it is inferior in the resiliency.

It is a matter of course that there is a difference in the preference for the feeling of a food upon eating between individuals. Accordingly, the feelings, upon eating, the doughnut of the present invention may variously be controlled by appropriately selecting the kinds of starches to be used such as tapioca starch, glutinous rice starch, waxy corn starch and starch acetates and hydroxypropyl starches thereof to thus give a doughnut having a sticky feeling upon eating and appropriate resiliency. It is also possible to use the foregoing starches simultaneously with other starches such as cross-linked starches, cross-linked etherified starches and/or cross-linked esterified starches, when it is desired to impart a higher resiliency to the final product.

The "pregelatinized starch" used in the present invention means starches pre-treated by heating starches in the presence of water to thus convert the starches into pastes and then drying the same so that they can get swollen or can be converted into pastes using water maintained at ordinary temperature. In this case, the polarization cross observed when such a starch is observed under a polarizing microscope is almost disappeared. The pregelatinized starch is in general prepared by, for instance, a method comprising the step of drying a starch suspension while converting the suspension into a paste using a drum dryer; or a method comprising the step of drying a gelatinized starch in a spray dryer; or a method comprising the step of simultaneously gelatinizing and drying a starch under a high pressure using an extruder. The pregelatinized starch used herein may be at least one member selected from the group consisting of potato starch, tapioca starch, waxy corn starch, glutinous rice starch, corn starch, wheat starch and modified starches obtained from the foregoing starches.

The "saccharide" used in the present invention means and includes general saccharides, for instance, monosaccharides and disaccharides such as glucose, sucrose, lactose, trehalose, maltose, fructose and isomerized saccharides; linear, cyclic or branched oligo saccharides; starch hydrolysates such as maltodextrin, powdered starch syrup and starch syrup; and reduced products thereof. All of the foregoing saccharides may be used in the present invention, but most preferably used herein are starch hydrolysates (including reduced products thereof) having a DE value ranging from 8 to 26. The use of such starch hydrolysates having a DE value ranging from 8 to 26 as the saccharide would easily permit the preparation of a doughnut showing sticky and resilient feelings upon eating and the achievement of sustained sticky and resilient feelings upon eating. Moreover, the use of such a saccharide would likewise permit the reduction of the probability of causing any scorching of the resulting dough during frying the same. In this case, the saccharide is not necessarily occupied by the starch hydrolysate having a DE value ranging from 8 to 26 and the foregoing effects can be accomplished by the use of such starch hydrolysates in an amount of not less than about ½ time the total amount of the saccharide. The starch hydrolysate having a DE value ranging from 8 to 26 can be prepared by dispersing a starch in water, adding an enzyme (such as α-amylase) and/or an acid (such as hydrochloric acid or oxalic acid) to the resulting dispersion, heating and gelatinizing the resulting-mixture to thus hydrolyze the starch till the DE value thereof falls within the range of from 8 to 26, purifying, if needed, the resulting hydrolysate by, for instance, decoloring and/or deionization and then drying the hydrolysate using, for instance, a spray dryer or a drum dryer. In addition, in case of the reduced product of the hydrolysate, hydrogenation is carried out subsequent to the foregoing hydrolysis.

The "wheat flour" used in the present invention is not restricted to any particular one and any commercially available one such as soft flour, medium flour, strong or hard flour and whole wheat flour may be used, but the resiliency of the resulting doughnut may vary depending on the content of gluten and accordingly, the wheat flour may appropriately be selected by preference or at request. Moreover, vital gluten may be added when it is desired to impart a higher resiliency to the final product and β-amylase may be added when it is desired to impart softer sticky and resilient feelings to the final product.

The present invention relates to a doughnut like a dumpling covered with sesame seeds, which has sticky and resilient feelings, upon eating, similar to those observed for the dumpling and ensures sustained sticky and resilient feelings upon eating. The doughnut having such characteristic properties can be obtained using the foregoing powdery raw material comprising ungelatinized starch, pregelatinized starch, wheat flour and a saccharide and more specifically a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide.

In the present invention, the foregoing mixing ratio of the raw materials is an essential requirement for obtaining dough having good quality and for obtaining a doughnut having excellent sticky and resilient feelings upon eating and excellent sustainment of the sticky and resilient feelings. In other words, the use of the foregoing powdery raw material would permit the preparation of the doughnut having basic characteristic properties according to the present invention, but seasoning components other than the foregoing ones may appropriately be incorporated into the powdery raw material depending on the preference and fancy.

Specific examples of such other seasoning components include, but not limited to, oils and fats derived from animals and vegetables such as butter, margarine, lard, shortening, corn oil, olive oil, salad oil, palm oil and powdered oils and fats; dairy products such as milk, fresh cream, concentrated milk, sweetened condensed milk, powdered milk, skimmed milk, yoghurt, cheese and liquid cheese; meat products derived from domestic animals such as ham, sausage, bacon and minced meat; egg products such as fresh eggs, dried eggs, dried egg white and dried egg yolk; vegetables, fruits and puree and dried products thereof such as strawberry, tomato, carrot, onion, spinach, apple, orange, peach, pineapple and raisin; nuts such as walnut, cashew nut, peanut and almond; foreign liquors such as brandy, liquors and rum; marine products such as shrimp, cod roe, krill and wakame seaweed; seeds such as sesame seeds, pine nuts and seeds of sunflower; spices such as pepper, cinnamon, garlic and curry powder; and other additives such as common salt, chocolate, cocoa, consommé, soy sauce, custard cream, sweetened bean jam and a variety of perfumes. In other words, any component useful for seasoning the doughnut may be used in the present invention while taking into consideration the consumers' preference.

These seasoning components may be kneaded into dough for preparing a doughnut of the present invention, the doughnut may be stuffed with these seasoning components as fillings as in case of the Chinese bun with a sweetened bean jam filling or the fried dumpling stuffed with minced pork, the doughnut may be smeared with seasonings or these seasonings may be incorporated into the doughnut of the present invention by any appropriate combination of the foregoing methods.

In the present invention, any particular problem does not arise when a doughnut is prepared by kneading these seasoning components into dough and then frying the resulting dough, but when a doughnut is prepared by stuffing dough with these seasonings as fillings and then frying the dough stuffed with the seasonings and if the powdery raw material has a low content of the saccharide, the dough is liable to come to a rupture during frying the same and to thereby break out the seasonings. Accordingly, in such cases, the content of the saccharide of the powdery raw material is increased. More specifically, it is preferred to use a powdery raw material comprising 50 to 80 parts by weight of ungelatinized starch, 6 to 25 parts by weight of pregelatinized starch, 7 to 30 parts by weight of wheat flour and 15 to 25 parts by weight of a saccharide.

The doughnut of the present invention can be prepared by adding water and desired seasoning components to a powdery raw material containing, as basic components, 50 to 80 parts by weight of ungelatinized starch, 6 to 25 parts by weight of pregelatinized starch, 7 to 30 parts by weight of wheat flour and a saccharide in an amount ranging from 7 to 25 parts by weight when the doughnut is free of any stuffed fillings and 15 to 25 parts by weight when the doughnut is stuffed with fillings; kneading these components to give dough; dividing the resulting dough into small pieces; forming each piece of dough into a desired shape, or stuffing the piece with fillings and then forming the piece into a desired shape; and then frying the shaped piece of dough.

Yeast may be added to the dough during the preparation thereof to thus ferment the dough over about one hour to thus give a doughnut having a high softness and sticky and resilient feelings upon eating and to reduce the time required for frying the dough or the time elapsed till the fried dough or a doughnut comes up to the surface of the frying oil. In particular, when the shaped dough pieces are treated in a continuous fryer, the fryer is equipped with a heater at the upper level of the oil and therefore, the temperature of the upper phase of the oil is high. Accordingly, it is necessary to make the doughnut come up to the surface of the oil as soon as possible in order to produce doughnuts efficiently. In this connection, when the dough used is free of any fillings, it is possible to make a doughnut come up to the surface of the oil without any trouble unless the dough is free of any yeast, but unless the dough is fermented using yeast, it takes a long period of time till the doughnut comes up to the surface in case of the doughnut stuffed with fillings. Accordingly, it is more effective to ferment the dough with yeast when the doughnut is stuffed with fillings.

The kneading process for preparing the dough may be performed using the usual mixing-stirring machine used in the preparation of confectionery and breads such as a vertical mixer, a horizontal mixer and a kneader. Moreover, the foregoing components may likewise manually be kneaded in a bowl. The foregoing components may be added in any order when dough is prepared, but it is preferred to add powdery components among the seasoning components to the powdery raw material to give a powdery mixture, subsequently admixing oils and fats with the powdery mixture, adding aqueous type ingredients such as milk, fresh eggs and water and then kneading the resulting mixture in order to obtain uniform dough.

The dough thus prepared is divided into small pieces having a desired size, each piece of dough is formed into a desired shape and the shaped pieces of dough are fried in an oil bath maintained at a temperature ranging from about 170 to 190° C. for about 2 to 10 minutes, which may vary depending on the size of the piece of dough.

The doughnut of the present invention thus prepared has sticky and resilient feelings upon eating like the rice cake and one can enjoy variations in appearance of the doughnut whose shapes extend from that similar to those of the conventional doughnuts to a variety of novel shapes. Moreover, the sticky and resilient feelings of the doughnut upon eating can be maintained even after 2 to 3 days from the preparation and if the doughnut is reheated in, for instance, a microwave oven to thus warm the same, the resulting doughnut reheated would have the mouth feeling and taste and texture almost identical to those observed immediately after frying the dough.

As has been discussed above in detail, the doughnut of the present invention can be prepared by simple operations, for instance, adding desired seasoning components to a powdery raw material, kneading the resulting mixture to give dough, forming the resulting dough into desired shapes and then frying the shaped dough and thus the dough may be prepared in each time. Alternatively, the dough prepared in advance is frozen after it is formed into desired shapes and the shaped and frozen dough may be fried at need without thawing.

In addition, if it is desired for the impartment of physiological functions to the doughnut or the supplementation of nutrients thereto, it is possible to add, if desired, each corresponding functional component such as various kinds of dietary fibers, a variety of oligo saccharides, polyunsaturated fatty acids, peptides, vitamins, polyphenols and minerals to the doughnut.

The present invention will hereunder be described in more detail with reference to the following Reference Examples and Working Examples. In the following Reference Examples and Working Examples, the terms "part" and "%" used mean "part by weight" and "% by weight", respectively.

REFERENCE EXAMPLE 1

To 130 parts of water, there was dissolved 20 parts of sodium sulfate, then 100 parts of tapioca starch was dispersed in the resulting aqueous solution to thus give a starch suspension. These operations were repeated three times to form three starch suspensions. To each starch suspension, there were added 35 parts of a 3% aqueous sodium hydroxide solution and 3.5 parts, 7.5 parts or 11 parts of propylene oxide, followed by reacting them at 39° C. for 22 hours, neutralization of the reaction system with hydrochloric acid, washing it with water, dehydration and drying thereof to give samples No. 1 (degree of substitution: 0.060), No. 2 (degree of substitution: 0.119) and No. 3 (degree of substitution: 0.165) of hydroxypropyl tapioca starch.

REFERENCE EXAMPLE 2

The same procedures used in Reference Example 1 were repeated except that the amount of water used was changed to 150 parts, that glutinous rice starch and waxy corn starch were substituted for the starch used in Reference Example 1 and that the amount of propylene oxide added was fixed to 7.5 parts to thus give samples No. 4 (hydroxypropyl glutinous rice starch having a degree of substitution of 0.117) and No. 5 (hydroxypropyl waxy corn starch having a degree of substitution of 0.124).

REFERENCE EXAMPLE 3

The same procedures used in Reference Example 1 were repeated except that potato starch was substituted for the starch used in Reference Example 1 and that the amount of propylene oxide added was changed to 7 parts to thus form a sample No. 6 (hydroxypropyl potato starch having a degree of substitution of 0.122).

REFERENCE EXAMPLE 4

To 150 parts of water, there was dispersed 100 parts of tapioca starch, 7.5 parts of acetic anhydride was added to the resulting dispersion while maintaining the pH value of the mixture to 8 to 9.5 by the addition of a 3% aqueous sodium hydroxide solution to thus acetylate the starch, followed by neutralization of the reaction system with hydrochloric acid, washing it with water and dehydration and drying the same to give a sample No. 7 (starch acetate having a degree of substitution of 0.074).

The ungelatinized starches prepared in the foregoing Reference Examples 1 to 4 are summarized in the following Table 1:

TABLE 1

| Sample No. | Raw Starch | Substituent | Deg. of Subst. |
|---|---|---|---|
| 1 | Tapioca starch | Hydroxypropyl | 0.060 |
| 2 | Tapioca starch | Hydroxypropyl | 0.119 |
| 3 | Tapioca starch | Hydroxypropyl | 0.165 |
| 4 | Glutinous rice starch | Hydroxypropyl | 0.117 |
| 5 | Corn starch | Hydroxypropyl | 0.124 |
| 6 | Potato starch | Hydroxypropyl | 0.122 |
| 7 | Tapioca starch | Acetyl | 0.074 |

EXAMPLE 1

There were prepared powdery raw materials specified in the following Table 2 using the hydroxypropyl tapioca starch (Sample No. 2) as the ungelatinized starch, MATSUNORIN M-22 (the trade name of a pre-gelatinized tapioca starch available from Matsutani Chemical Industry Co., Ltd.) as the pregelatinized starch, strong flour as the wheat flour and TK-16 (the trade name of a maltodextrin having a DE of 16 available from Matsutani Chemical Industry Co., Ltd.) as the saccharide.

TABLE 2

| Raw Material No. | Ungelatinized starch (part) | Pregelatinized starch (part) | Wheat Flour (part) | Saccharide (part) |
|---|---|---|---|---|
| 1 | 45 | 15 | 20 | 20 |
| 2 | 55 | 13 | 12 | 20 |
| 3 | 60 | 13 | 10 | 17 |
| 4 | 72 | 10 | 10 | 8 |
| 5 | 88 | 4 | 4 | 4 |
| 6 | 65 | 7 | 15 | 13 |
| 7 | 60 | 22 | 8 | 10 |
| 8 | 56 | 28 | 8 | 8 |
| 9 | 65 | 16 | 5 | 14 |
| 10 | 55 | 7 | 25 | 13 |
| 11 | 52 | 6 | 35 | 7 |
| 12 | 65 | 15 | 15 | 5 |
| 13 | 58 | 10 | 10 | 22 |
| 14 | 52 | 10 | 10 | 28 |

Each of the resulting powdery raw material (100 parts each) was introduced into HOBERT Mixer (available from Hobert Company, Canada), one part of common salt and one part of skimmed milk were also added to the mixer, these components were admixed for 3 minutes at a low speed, followed by the addition of 20 parts of shortening, mixing the mixture for 3 minutes at a low speed, introduction, into the mixer, of 10 parts of whole eggs and water in an amount ranging from 40 to 60 parts and controlled depending on the powdery raw material used such that the hardness of the resulting mixture was almost equal to that of the earlobe, mixing the mixture for 3 minutes at a low speed and for 4 minutes at a high speed, allowing the mixture to stand for 15 minutes (floor time) and then division of the resulting dough into small pieces (30 g each). Each piece of dough was formed into a circular shape and then fried at 180° C. for 4 minutes to thus give a doughnut. The resulting doughnuts were evaluated according to the following evaluation criteria. The results thus obtained are summarized in the following Table 3.

Evaluation Criteria

Conditions of Dough (C.D.)
⊚: The dough is free of any pasty characteristic, has good integrity and is excellent in the shaping ability.
○: The dough is almost free of any pasty characteristic and can easily be shaped.
Δ: The dough is pasty or slightly inferior in the integrity and slightly hardly shaped.
×: The dough is strongly pasty or inferior in the integrity and hardly shaped.

Appearance (AP.)
⊚: The dough is uniformly puffed and the color tone of the surface thereof is also uniform after frying.
○: The dough is relatively uniformly puffed and the color tone of the surface thereof is likewise relatively uniform.
Δ: The dough is slightly non-uniformly puffed and the color tone of the surface thereof is slightly non-uniform.
×: The dough is non-uniformly puffed and the color tone of the surface thereof is also non-uniform.

Mouth Feeling (MF.)
⊚: The dough has quite strong sticky and resilient feelings like those observed for the rice cake, upon eating the same.
○: The dough has strong sticky and resilient feelings like those observed for the rice cake, upon eating the same.
Δ: The dough has slightly weak sticky and resilient feelings like those observed for the rice cake and slightly dry and crumbling feelings, upon eating the same.
×: The dough has weak sticky and resilient feelings like those observed for the rice cake and dry and crumbling feelings, upon eating the same.

Changes in Mouth Feeling with the Elapse of Time (CMF. WT.; the doughnut prepared was air-tightly sealed, stored at room temperature, heated for 20 seconds in a microwave oven (500 W) with the elapse of time and the results thus obtained were compared with those observed for the doughnut immediately after the preparation thereof)
⊚: The dough undergoes almost no change in the mouth feeling even after 3 days from the preparation.
○: The dough undergoes almost no change in the mouth feeling even after 2 days from the preparation.
Δ: The dough undergoes a change in the mouth feeling after 2 days from the preparation.
×: The dough undergoes a change in the mouth feeling after one day from the preparation.

TABLE 3

| | Powdery Raw Material | C.D. | AP. | MF. | CMF. WT. |
|---|---|---|---|---|---|
| Comp. Example | 1 | × | Δ | × | Δ |
| Example | 2 | ○ | ○ | ○ | ⊚ |
| Example | 3 | ⊚ | ⊚ | ⊚ | ⊚ |
| Example | 4 | ⊚ | ⊚ | ○ | ○ |
| Comp. Example | 5 | × | Δ | Δ | × |
| Example | 6 | ○ | ⊚ | ○ | ○ |
| Example | 7 | ○ | ○ | ○ | ○ |
| Comp. Example | 8 | × | × | Δ | Δ |
| Comp. Example | 9 | Δ | Δ | Δ | ○ |
| Example | 10 | ○ | ○ | ○ | ○ |
| Comp. Example | 11 | ○ | Δ | × | × |
| Comp. Example | 12 | ○ | Δ | Δ | Δ |
| Example | 13 | ○ | ○ | ○ | ⊚ |
| Comp. Example | 14 | ○ | Δ | Δ | ○ |

EXAMPLE 2

The same procedures used in Example 1 were repeated using the powdery raw material Nos. 3, 4, 10 and 13 to thus prepare dough, 30 parts of the resulting dough, which had been divided into small pieces, were stuffed with 15 parts of sweetened bean jam to give shaped dough pieces stuffed with sweetened bean jam and then the dough pieces were fried at 180° C. for 5 minutes to prepare doughnuts each stuffed with sweetened bean jam.

As a result, it was found that when using the powdery raw material No. 3 (containing 17 parts of the saccharide) and the powdery raw material No. 13 (containing 22 parts of the saccharide), whose saccharide content exceeds 15 parts by weight, there was not observed any rupture of the doughnuts and the resulting doughnuts were firmly stuffed with sweetened bean jam. Moreover, the appearance, mouth feeling and mouth feeling change with time of these doughnuts had tendencies almost identical to those observed for the doughnuts free of any stuffed sweetened bean jam.

On the other hand, when using the powdery raw material No. 10 (containing 13 parts of the saccharide) whose saccharide content is less than 15 parts by weight, there was observed the rupture of the doughnuts, although the extent of the rupture was small and there was observed the considerable rupture of the doughnuts when using the powdery raw material No. 4 (containing 8 parts of the saccharide) and the outward flow of the sweetened bean jam.

EXAMPLE 3

The same procedures used in Example 1 were repeated except that the materials specified in the following Table 4 were used in the powdery raw material No. 3 used in Example 1 as the ungelatinized starch and the saccharide to thus prepare doughnuts. Moreover, the resulting doughnuts were inspected or evaluated for the foregoing properties examined in Example 1 according to the same methods. The results obtained are likewise listed in Table 4. In Table 4, PDX#3 represents PINEDEX #3 (the trade name of maltodextrin having a DE of 25.2 available from Matsutani Chemical Industry Co., Ltd.), PDX#2 represents PINEDEX #2 (the trade name of maltodextrin having a DE of 10.5 available from Matsutani Chemical Industry Co., Ltd.) and the tapioca starch means un-processed tapioca starch. Moreover, in the column of Table 4 entitled "Saccharide", the combination of TK-16 and soft sugar (sucrose) comprises 10 parts of TK-16 and 7 parts of soft sugar (sucrose).

TABLE 4

| Sample No. | ungelatinized starch Sample No. | Saccharide | C.D. | AP. | MF. | CMF. WT. |
|---|---|---|---|---|---|---|
| 3-1 | 1 | TK-16 | ⊚ | ⊚ | ⊚ | ⊚ |
| 3-2 | 3 | TK-16 | ⊚ | ⊚ | ⊚ | ⊚ |
| 3-3 | 4 | TK-16 | ⊚ | ⊚ | ⊚ | ⊚ |
| 3-4 | 5 | TK-16 | ⊚ | ⊚ | ⊚ | ⊚ |
| 3-5 | 6 | TK-16 | ⊚ | ⊚ | ○ | ○ |
| 3-6 | 7 | TK-16 | ⊚ | ⊚ | ⊚ | ⊚ |
| 3-7 | Tapioca starch | TK-16 | ⊚ | ○ | ⊚ | ○ |
| 3-8 | 2 | PDX#3 | ⊚ | ⊚ | ⊚ | ⊚ |
| 3-9 | 2 | PDX#3 | ⊚ | ⊚ | ⊚ | ⊚ |
| 3-10 | 2 | Soft sugar (sucrose) | ⊚ | ○ | ○ | ○ |
| 3-11 | 2 | Starch syrup | ⊚ | ○ | ○ | ○ |
| 3-12 | 2 | TK-16 and Soft sugar (sucrose) | ⊚ | ⊚ | ⊚ | ⊚ |

EXAMPLE 4

A powdery raw material was prepared using 60 parts of the sample No. 3 as the ungelatinized starch, 15 parts of MATSUNORIN W (the trade name of a pre-gelatinized wheat starch available from Matsutani Chemical Industry Co., Ltd.) as the pregelatinized starch, 9 parts of strong flour as the wheat flour and 16 parts of TK-16 as the saccharide.

This powdery raw material (100 parts) was introduced into HOBERT Mixer, one part of common salt and one part of skimmed milk were also added to the mixer, these components were admixed for 3 minutes at a low speed, followed by the addition of 10 parts of shortening and 10 parts of Parmesan cheese, mixing the mixture for 3 minutes at a low speed, introduction, into the mixer, of 10 parts of whole eggs and 55 parts of water, mixing the mixture for 3 minutes at a low speed and for 4 minutes at a high speed, division of the resulting dough into small pieces (30 g each) and then stuffing the pieces with 15 g each of fillings having the flavor of cheese.

Separately, the same procedures used above were repeated using the same powdery raw material except that 3 parts of yeast were introduced into the mixer together with the whole eggs and water to thus give dough, followed by the fermentation thereof for 50 minutes, division of the resulting dough into small pieces (30 g each), stuffing the pieces with 15 g each of fillings having the flavor of cheese and then the proofing of the divided dough pieces stuffed with the fillings for 30 minutes (at 38° C.).

The dough pieces stuffed with the fillings prepared above were fried at 180° C. for 5 minutes to thus give doughnuts.

The dough pieces subjected to the yeast-fermentation came up to the surface of the oil after about one minute, but it took about 4 minutes till the dough pieces free of any yeast-fermentation came up to the surface of the oil.

Moreover, the yeast-fermented doughnut had uniform color developed through frying, it was slightly soft as compared with the doughnut free of any yeast-fermentation and had sticky and resilient feeling upon eating and had a large volume. Furthermore, when the doughnut was reheated in a microwave oven, it had good mouth feeling substantially identical to that observed immediately after the initial frying even after storing it at room temperature for 3 days.

EXAMPLE 5

To 100 parts of powdery raw material comprising 35 parts of hydroxypropyl tapioca starch (Sample No. 3) and 18 parts of hydroxypropyl waxy corn starch (Sample No. 5) as ungelatinized starch, 12 parts of MATSUNORIN M-22 as pregelatinized starch, 15 parts of soft flour as wheat flour and 20 parts of TK-16 as the saccharide, there were added one part of common salt and 2 parts of TOP BP Deluxe (the trade name of baking powder available from OKUNO Pharmaceutical Co., Ltd.) and the resulting mixture was admixed for 3 minutes at a low speed, followed by addition of 15 parts of shortening and admixing for 3 minutes. Then 30 parts of whole eggs, 5 parts of sweetened condensed milk and 40 parts of water were added to the resulting mixture and the latter was kneaded for one minute at a low speed to give dough. The dough was formed into a chrysanthemum rod-like shape using a squeegee mouthpiece and quick-frozen at −40° C. After the frozen dough was stored at −20° C. for 10 days, it was fried at 185° C. for 3 minutes without thawing the same and the resulting product was sprayed and smeared with cinnamon sugar to thus give a CHURROS-like doughnut.

This CHURROS-like doughnut had sticky and resilient feeling upon eating and the mouth feeling thereof was almost identical to that observed immediately after the preparation even after it was air-tightly sealed and then stored at room temperature for 3 days.

What is claimed is:

1. A doughnut prepared using a powdery raw material, which comprises 50 to 80 parts by weight of ungelatinized starch, 6 to 25 parts by weight of pregelatinized starch, 7 to 30 parts by weight of wheat flour and 7 to 25 parts by weight of a saccharide, wherein the ungelatinized starch is starch acetate and/or hydroxypropyl starch obtained from at least one member selected from the group consisting of glutinous rice starch, waxy corn starch, potato starch and tapioca starch.

2. The doughnut of claim 1, wherein the amount of the saccharide ranges from 15 to 25 parts by weight.

3. The doughnut of claim 2, wherein the doughnut is stuffed with fillings.

4. The doughnut as set forth in any one of claims 1 to 3, wherein not less than 50% by weight of the saccharide is a starch hydrolysate having a DE value ranging from 8 to 26.

5. Dough used for the preparation of a doughnut obtained by adding water and, if needed, a seasoning component to a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide to thus form dough, dividing the resulting dough into small pieces and forming each small piece into a desired shape and, if needed, stuffing the shaped dough with sweetened bean jam, wherein the ungelatinized starch is starch acetate and/or hydroxypropyl starch obtained from at least one member selected from the group consisting of glutinous rice starch, waxy corn starch, potato starch and tapioca starch.

6. The dough used for the preparation of a doughnut of claim 5, wherein the amount of the saccharide ranges from 15 to 25 parts by weight.

7. The dough used for the preparation of a doughnut of claim 6, wherein the dough is stuffed with fillings.

8. The dough used for the preparation of a doughnut as set forth in any one of claims 5 to 7, wherein not less than 50% by weight of the saccharide is a starch hydrolysate having a DE value ranging from 8 to 26.

9. The dough used for the preparation of a doughnut as set forth in any one of claims 5 to 7, wherein yeast is added to the dough during the preparation thereof to thus ferment the dough.

10. The dough used for the preparation of a doughnut as set forth in any one of claims 5 to 7, wherein the dough is frozen.

11. A method for the preparation of a doughnut as set forth in any one of claims 1 to 3, comprising the step of frying dough, wherein the dough is obtained by adding water and, if needed, a seasoning component to a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide to thus form dough, dividing the resulting dough into small pieces and forming each small piece into a desired shape and, if needed, stuffing the shaped dough with sweetened bean jam, and wherein the ungelatinized starch is starch acetate and/or hydroxyproyl starch obtained from at least one member selected from the group consisting of glutinous rice starch, waxy corn starch, potato starch and tapioca starch.

12. A method for the preparation of a doughnut as set forth in any one of claims 1 to 3, comprising the step of frying frozen dough without thawing the frozen dough, wherein the dough is obtained by adding water and, if needed, a seasoning component to a powdery raw material comprising 50 to 80 parts by weight of ungelatinized starch, 6 to 25 parts by weight of pregelatinized starch, 7 to 30 parts by weight of wheat flour and 7 to 25 parts by weight of a saccharide to thus form dough, dividing the resulting dough into small pieces and forming each small piece into a desired shape and, if needed, stuffing the shaped dough with sweetened bean jam, and wherein the ungelatinized starch is starch acetate and/or hydroxypropyl starch obtained from at least one member selected from the group consisting of glutinous rice starch, waxy corn starch, potato starch and tapioca starch.

* * * * *

UNITED STATES PATENT AND TRADEMARK OFFICE
CERTIFICATE OF CORRECTION

PATENT NO. : 7,282,231 B2 Page 1 of 1
APPLICATION NO. : 10/652249
DATED : October 16, 2007
INVENTOR(S) : Katsuyuki Yamamoto It is certified that error appears in the above-identified patent and that said Letters Patent is hereby corrected as shown below:

On the Title Page Item (73), the Assignee's name Marsutani Chemical Industries Co., Ltd. should be replaced with: <u>Matsutani Chemical Industries Co., Ltd.</u>

Signed and Sealed this

Eighth Day of July, 2008

JON W. DUDAS
*Director of the United States Patent and Trademark Office*